United States Patent [19]

Nakamura et al.

[11] Patent Number: 5,530,218
[45] Date of Patent: Jun. 25, 1996

[54] SPOT WELDING APPARATUS

[75] Inventors: Yoshio Nakamura, Hadano; Shinichi Kitaguchi, Ayase; Yoshihiko Yamaguchi, Hadano, all of Japan

[73] Assignee: Amada Metrecs Company, Limited, Isehara, Japan

[21] Appl. No.: 374,234

[22] Filed: Jan. 18, 1995

[30] Foreign Application Priority Data

May 30, 1994 [JP] Japan .................................. 6-116639
Jun. 27, 1994 [JP] Japan .................................. 6-144304

[51] Int. Cl.⁶ ................................................ B23K 37/02
[52] U.S. Cl. .................................. 219/86.25; 219/86.31
[58] Field of Search ........................... 219/86.21, 86.25, 219/86.31, 86.8, 120

[56] References Cited

U.S. PATENT DOCUMENTS 4,267,424  5/1981  Shimatake et al. .................. 219/86.41

FOREIGN PATENT DOCUMENTS 9203209   6/1992  Germany .
1-266970  10/1989 Japan ................................ 219/86.25
3-56147   6/1990  Japan .
3-56148   8/1991  Japan .
6-218553  8/1994  Japan ................................ 219/86.31
6-328265  11/1994 Japan .

Primary Examiner—Teresa J. Walberg
Assistant Examiner—J. Pelham
Attorney, Agent, or Firm—Wigman, Cohen, Leitner & Myers

[57] ABSTRACT

In a spot welding apparatus in which a column (7) is stood on a base (5) provided with a worktable (3) for supporting work (W); and a welding arm (15) having an electrode (13) at a free end portion thereof is pivotally supported up and down at a lower portion of a support cylinder (11) hung from a support beam (9) supported by the column (7) horizontally, the spot welding apparatus comprises an arm supporting section (47) for supporting support members (49, 55, 53, 57) for pivotally supporting the welding arm (15), so as to be movable up and down relative to the support cylinder (11) and further urged upward; and an arm pressing section (37) for pressing a free end portion of the welding arm (15) downward against an urging force of the arm supporting section.

8 Claims, 3 Drawing Sheets

SPOT WELDING APPARATUS

BACKGROUND OF THE INVENTION

1. Field of the Invention

The present invention relates to a spot welding apparatus improved in pressing an overlapped portion of work mounted on a worktable by an electrode attached to a welding arm vertically movable over the worktable to spot-weld the work by passing current between the electrode and the worktable.

In more detail, the present invention relates to a spot welding which can facilitate the exchanging work of various electrodes according to work and further can support various electrodes of different sizes stably.

2. Description of Related Art

As an example of the conventional spot welding apparatus related to the present invention, there is Japanese Published Examined Patent Application No. 3-56148. In this conventional apparatus, the structure is such that a column is stood on a base provided with a worktable for supporting work; a support cylinder is hung vertically from an end portion of a support beam pivotally supported by the column in the horizontal direction; and a welding arm having an electrode at the end portion thereof is pivotally supported at the lower portion of the support cylinder.

In use of the above-mentioned conventional spot welding apparatus, the worker first brings up the electrode attached to the end portion of the welding arm by gripping a handle attached to the base end portion of the welding arm, and further moves the welding arm by holding the welding arm horizontally. Here, since the welding arm is held in the horizontal direction, the welding arm can be moved only horizontally.

Therefore, there exists such a problem in that when the electrode attached to the fee end portion of the welding arm is heavy, for instance, a laborious work is required to bring up the end portion of the welding arm.

In addition, in the conventional structure, a piston rod of a hydraulic cylinder disposed at the upper portion of the afore-mentioned support cylinder and the base end portion of the welding arm are linked with each other by a wire. Therefore, when this wire is pulled, the end portion of the welding arm is pivoted downward, so that the electrode attached to the end portion thereof can press the work mounted on the worktable. As a result, when the worktable is vibrated by an external force, there exists such a problem that the wire is resonated as a string and thereby the contact pressure between the electrode and the work is unstable, with the result that the spot welding itself becomes unstable.

Further, when the spot welding apparatus is used for many hours, there exists another problem in that the wire tends to be elongated or broken at the worst due to fatigue, thus causing a trouble from the standpoint of maintenance.

SUMMARY OF THE INVENTION

With these problems in mind, therefore, it is a first object of the present invention to provide a spot welding apparatus which can easily move the welding arm horizontally and can provide a stable spot welding without fluctuation of the contact pressure between the electrode and the work.

Further, a second object of the present invention is to provide a spot welding apparatus which can facilitate the exchanging work of the electrodes to the welding arm whenever the electrode is exchanged with another electrode according to the shapes of work to be spot welded.

To achieve the above-mentioned object, the present invention provides a spot welding apparatus in which a column is stood on a base provided with a worktable for supporting work; and a welding arm having an electrode at a free end portion thereof is pivotally supported up and down at a lower portion of a support cylinder hung from a support beam supported by the column horizontally, which comprises: arm supporting means for supporting support members for pivotally supporting the welding arm up and down, so as to be movable up and down relative to the support cylinder and further urged upward; and arm pressing means for pressing a free end portion of the welding arm downward against an urging force of said arm supporting means.

In the spot welding apparatus, a vertical position of the support beam is adjustable upward and downward.

Further, said arm supporting means is constructed in such a way that the welding arm is pivotally supported at a lower end portion of a piston rod projecting downward from a piston provided at the lower portion of the support cylinder so as to be movable up and down; and a hydraulic chamber is provided between the piston and an end block disposed at a lower portion of the support cylinder.

Further, the hydraulic pressure of the hydraulic chamber is adjustable.

Further, the arm pressing means comprises a hydraulic cylinder attached to an upper portion of the support cylinder; and an up-and-down rod fitted into the support cylinder, for pressing downward a piston provided for said arm supporting means, when moved downward by the hydraulic cylinder.

Further, the present invention provides a spot welding apparatus in which a column is stood on a base provided with a worktable for supporting work; and a welding arm having an electrode at a free end portion thereof is pivotally supported up and down at a lower portion of a support cylinder hung from a support beam supported by the column horizontally, wherein the welding arm comprises an electrode holder having an electrode at a free end portion thereof, and a holder arm for exchangeably supporting the electrode holder; a cooling water supply passage and a cooling water drain passage formed in the holder arm and a cooling water supply passage and a cooling water drain passage formed in the electrode holder are so provided as to be connectable with each other, respectively; and the respective cooling water passages and the cooling water drain passages are both provided concentrically with respect to each other, respectively.

Further, a fitting hole formed at a free end portion of the holder arm and a base end portion of the electrode holder are both formed so as to be removably fitted to each other; when the base end portion of the electrode holder is fitted into the fitting hole of the holder arm, an end portion of any one of the cooling water supply passage and the cooling water drain passage of the electrode holder is connected to a sealing plug to which an end of any one of the cooling water supply passage and the cooling water drain passage of the holder arm is connected; and any one of the cooling water drain passage and the cooling water supply passage of the holder arm is connected to any one of the cooling water drain passage and the cooling water supply passage of the electrode holder through a bypass passage formed in the holder arm.

DETAILED DESCRIPTION OF THE EMBODIMENTS

Figure 1:
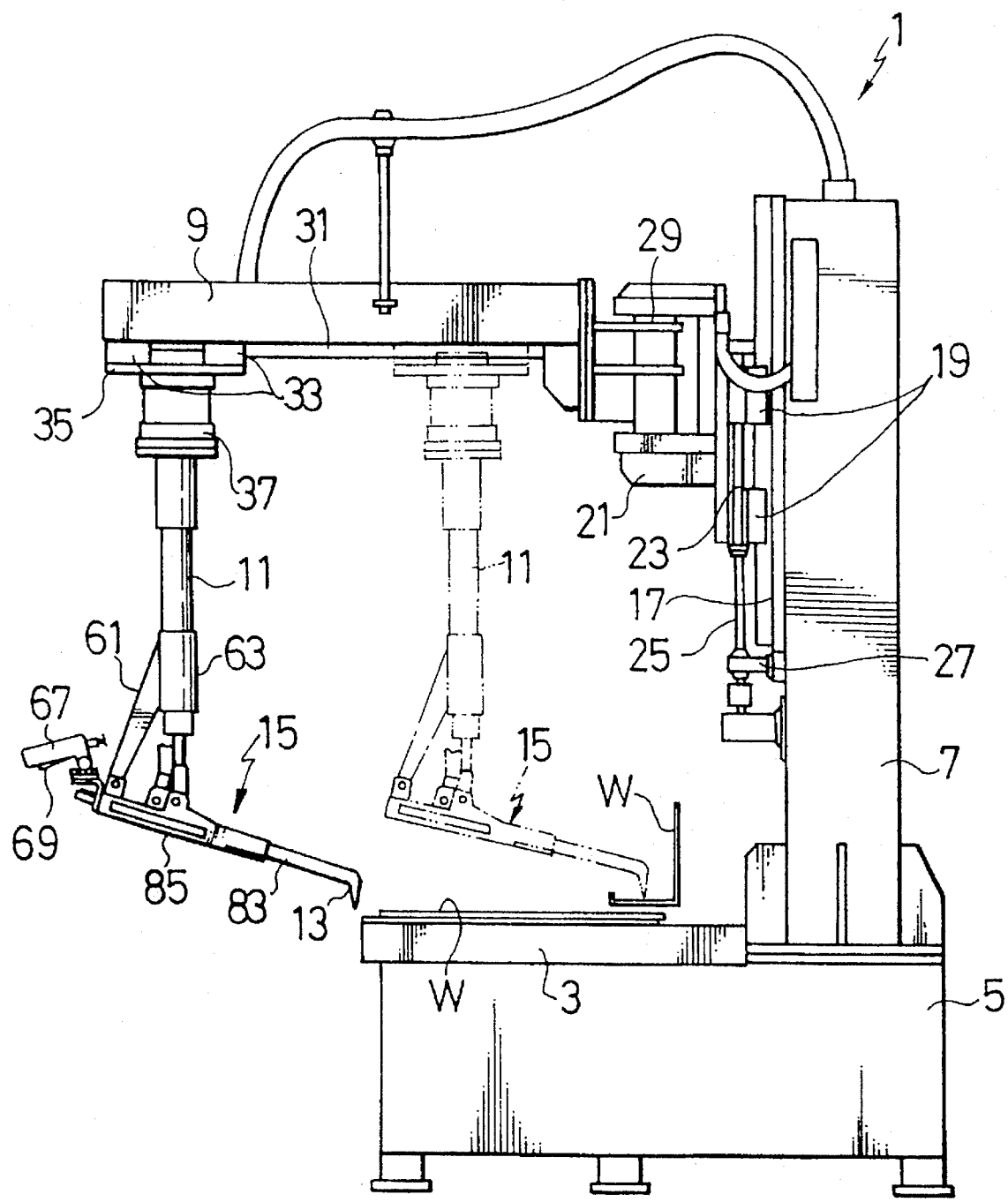
FIG. 1 is a front view showing an embodiment of the spot welding apparatus according to the present invention.

With reference to FIG. 1, in the spot welding apparatus 1 according to the present invention, a column 7 is stood on a base 5 provided with a worktable 3 for supporting work W; a support cylinder 11 is hung vertically from a support beam 9 supported by the column 7 in the horizontal direction; a welding arm 15 is supported at the lower portion of the support cylinder 11 so as to be movable in the vertical direction; and an electrode 13 is attached to the end portion of the welding arm 15.

In more detail, the column 7 is provided with a vertical guide member 17. A vertical driving device 23 such as a hydraulic cylinder is mounted on a slide member 21 having a slide guide 19 movable vertically along the guide member 17.

Further, a lower end portion of a piston rod 25 extending downward from the vertical driving device 23 is fixedly supported by a bracket 27 fixed to the column 7. Further, a base end portion of the support beam 9 is supported so as to be pivotal on a horizontal plane around a pivotal axle 29 attached vertically to the slide member 21.

Accordingly, when the vertical driving device 23 is driven to move the slide member 21 up and down, the support beam 9 can be moved also up and down, so that it is possible to adjust the vertical position of the support beam 9. Further, since the support beam 9 can be pivoted around the pivotal axle 29, it is possible to adjust the pivotal position of the support beam 9.

At the lower surface of the support beam 9, a horizontal guide member 31 is provided. A slide member 35 having a slide guide 33 is slidable along this guide member 31 of the support beam 9. To the lower surface of the slide member 35, there is attached a hydraulic cylinder (arm pressing means) 37 for pressing the free end portion of the welding arm 15 downward.

Figure 2:
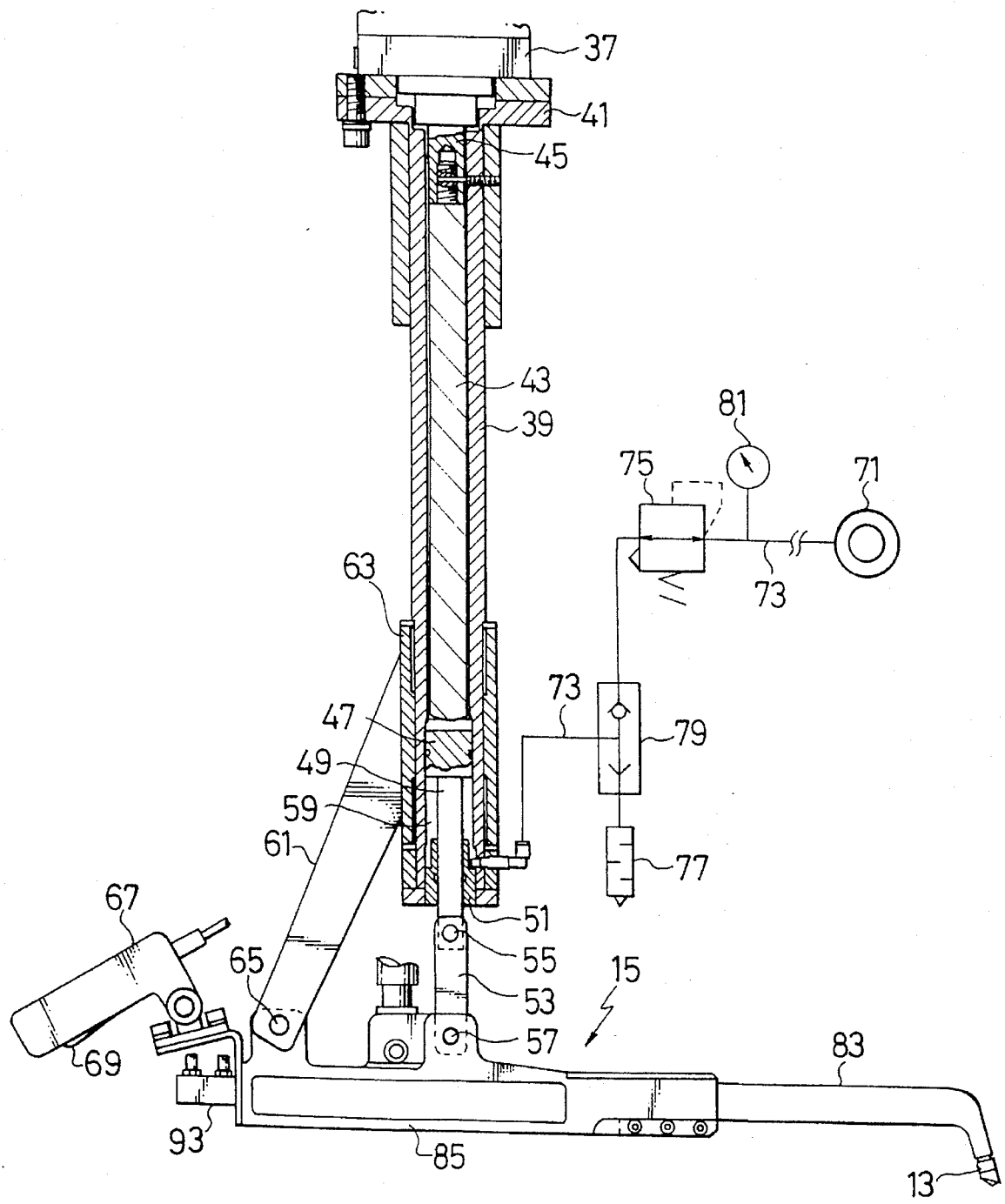
FIG. 2 is a cross-sectional view showing the structure of the welding arm supporting section of the same spot welding apparatus.

As shown in FIG. 2, to the lower surface of the hydraulic cylinder 37, a bracket 41 to which a support cylinder 39 is vertically fixed is attached by a plurality of bolts. Into this support cylinder 39, a up-and-down rod 43 movable up and down is fitted. The upper end of the up-and-down rod 43 is screwed to a piston rod 45 fitted into the hydraulic cylinder 37 so as to be movable up and down.

To the lower portion of the support cylinder 39, a piston (arm supporting means) 47 for supporting the welding arm 15 is fitted so as to be also movable up and down. Further, a piston rod 49 extending downward from this piston 47 is passed through an end block 51 fixed to the lower end portion of the support cylinder 39 also so as to be movable also up and down. Further, to the lower end portion of this piston rod 49, an upper end portion of a link 53 is pivotally connected via a pin 55. The lower end portion of this link 53 pivotally supports a middle portion of the welding arm 15 via another pin 57.

A hydraulic chamber 59 is formed between the piston 47 and the end block 51. Owing to the pressure of this hydraulic chamber 59, the piston 47 is always urged in the upward direction, so that the upper surface of the piston 47 is kept at such a condition as to be brought near or into contact with the lower end surface of the up-and-down rod 43.

Further, at the lower portion of the support cylinder 39, an outer cylinder member 63 formed with a bracket 61 is fixed. By this bracket 61, the base end portion of the welding arm 15 is supported by a pivotal axle 65 so as to be pivotal upward and downward (clockwise or counterclockwise). Further, a handle 67 is attached to the base end portion of the welding arm 15. A start switch 69 is mounted on this handle 67.

To adjust the pressure within the hydraulic chamber 59 according to the size and the weight of the electrode 13 attached to the free end portion of the welding arm 15 (because the electrode 13 is exchanged according to work), a hydraulic circuit having a pressure reduction regulation valve 75 is connected between a pressure source (e.g., air source) 71 and the hydraulic chamber 59. In addition, a quick exhaust valve 79 connected to a muffler 77 is arranged on the downstream side of the pressure reduction regulation value 75. Further, a pressure meter 81 is connected to the hydraulic circuit 73.

In the above-mentioned construction, after the electrode 13 attached to the welding arm is has been exchanged, when the free end portion of the welding arm 15 is inclined right side down due to the weight of the electrode 13 in FIG. 2, an adjust screw (not shown) arranged in the pressure reduction regulation valve 75 is rotated to increase the pressure in the hydraulic chamber 59 in order to support the welding arm 15 roughly horizontally.

In contrast with this, when the welding arm 15 is inclined right side up in FIG. 2, the adjust screw is rotated to decrease the pressure in the hydraulic chamber 59 in order to support the welding arm 15 also roughly horizontally.

As described above, in the present invention, even when the electrode 13 is replaced with another one and thereby the weight of the electrode 13 changes, it is possible to always maintain the welding arm 15 at any desired inclination angle (including the horizontal position) by adjusting the pressure within the hydraulic chamber 59 by use of the adjust screw of the pressure reduction regulation valve 75.

After the welding arm 15 has been maintained at roughly the horizontal position or any desired inclination angle, the support beam 9 is pivoted around the pivotal axle 29 appropriately and in addition the slide member 33 is moved along the support beam 9 appropriately, so that the electrode 13 attached to the free end portion of the welding arm 15 can be located at any desired spot welding position on the work W mounted on the worktable 3. Further, the vertical driving device 23 is driven to move the slide member 21 up and down along the column 7, that is, the support beam 9 to adjust the height of the welding arm 15 relative to the work W.

Further, in the case where the work W is formed with a vertically extending portion and thereby there exists a possibility that when the welding arm 15 is moved or pivoted, the welding arm 15 interferes with the work W, it is necessary to previously adjust the height of the welding arm 15 at a relatively high position by driving the vertical driving device 23. Instead, it is also possible to move the electrode 13 upward by increasing the pressure within the hydraulic chamber 59 so that the free end portion of the welding arm 15 can be inclined right side up. That is, it is possible to select any one of the methods of moving the welding arm 15 upward by driving the vertical driving device 23 or by adjusting the pressure within the hydraulic chamber 59, according to the work situations or on that occasion. Further, the vertical driving device 23 can be driven even when the welding arm 15 is being moved.

As described above, in the present embodiment, when the welding arm 15 is pivoted horizontally to locate the electrode 13 at any desired spot welding position on the work W, since the weight of the welding arm 15 can be supported by the pressure within the hydraulic chamber 59, the worker can only grip and move the handle 67 simply without any laborious work, thus facilitating the movement of the welding arm 15.

After the electrode 13 has been located at the spot welding position on the work W by pivoting the welding arm 15 as described above, when the hydraulic cylinder 37 is actuated to move the up-and-down rod 43 downward, since the piston 47 is moved downward against the pressure within the hydraulic chamber 59, the welding arm 15 can be pivoted clockwise around the pivotal axle 65 in FIG. 2. Therefore, the electrode 13 attached to the free end portion of the welding arm 15 can be brought into pressure contact with the work W, so that the work W can be pressure fixed onto the worktable 3 for spot welding.

In more detail, after the electrode 13 has been located at the welding position, when the start switch 69 is turned on, the hydraulic cylinder (arm pressing means) 37 is actuated, so that the welding arm 15 is pivoted downward to press the electrode 13 against the work W.

After that, after an initial pressurization delay time determined by a timer provided in a control unit (not shown) has elapsed, current is passed through the electrode 13 and the work W for spot welding. Further, after a hold time decided by the control unit has elapsed, the hydraulic cylinder 37 is moved upward to de-pressurize the work W.

In other words, when the start switch 69 is turned on after the electrode 13 has been located at the welding position, since the operation of the hydraulic cylinder 37 and the conduction of the electrode 13 are both controlled in accordance with a series of sequential programs previously stored in the control unit, it is possible to spot weld the work W automatically.

After the spot welding has been made as described above, when the welding arm 15 is released from the pressurization against the work W by the de-actuation of the hydraulic cylinder 37, since the piston 47 is restored upward to the original position by the pressure of the hydraulic cylinder 37, the welding arm 15 is restored to the original position. Therefore, it is unnecessary for the worker to lift the free end portion of the welding arm 15, thus facilitating the spot welding work.

As described above, in the present embodiment, since the structure is such that when the work W is required to be pressed against the worktable by the electrode 13, the piston (arm pressing means) 47 can be moved by the up-and-down rod 43; that is, the up-and-down rod 43 is not vibrated as a string, so that it is possible to stably press the electrode 13 against the work W without resonance with an external force or vibration.

The welding arm 15 will be explained in further detail with reference to FIGS. 3 and 4.

Figure 3:
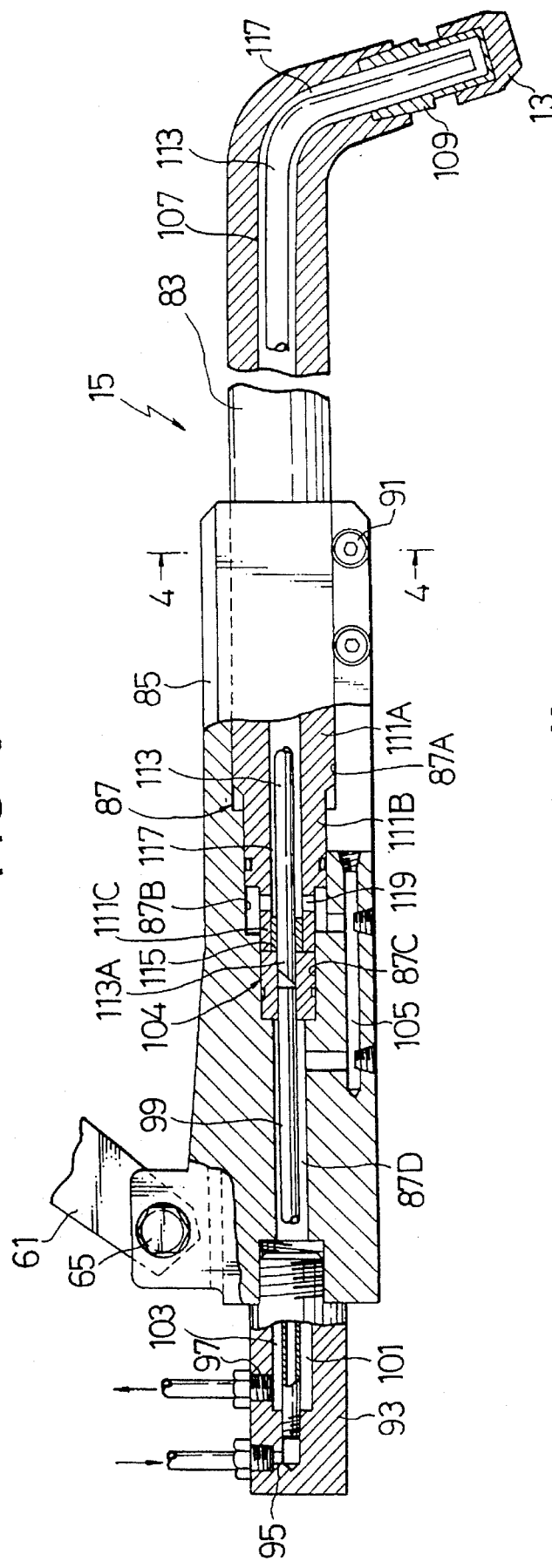
FIG. 3 is a partial cross-sectional view showing the welding arm of the same spot welding apparatus.
Figure 4:
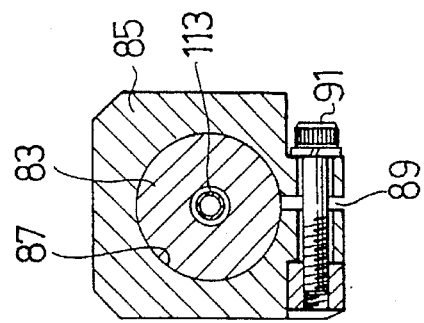
FIG. 4 is a cross-sectional view taken along the line 4—4 shown in FIG. 3.

As shown in detail in FIG. 3, the welding arm 15 is composed of an electrode holder 83 provided with the electrode 13 at the free end thereof and a holder arm 85 for removably holding the electrode holder 83.

To exchangeably attach the electrode holder 83 to the holder arm 85, the holder arm 85 is formed with a fitting hole 87 at the free end portion thereof so that the base end portion of the electrode holder 83 can be fitted thereinto. In addition, a slit 89 (as shown in FIG. 4) is formed at the free end portion of the holder arm 85. At this slit 89, a plurality of fastening bolts 91 are arranged to reduce the gap of the slit 89 so that it is possible to fasten the electrode holder 83 fitted into the fitting hole 87.

In more detail, the fitting hole 87 is composed of a large diameter hole 87A, an intermediate diameter hole 87B and a small diameter hole 87C formed stepwise beginning from the free end portion thereof, and the small diameter hole 87C communicates with a through hole 87D.

Further, a Joint block 93 is screwed to the base end portion of the holder arm 85. This joint end 93 is formed with a water supply opening 95 for supplying a cooling water and a drain opening 97 for draining the supplied cooling water. The supply opening 95 is connected to one end portion of a supply pipe 99. This supply pipe 99 is arranged passing through a hole 101 formed in the Joint block 93 and a through hole 87D formed in the holder arm 85. The other end portion of this supply pipe 99 is connected to a cylindrical seal plug 104 fitted to the small diameter hole 87C of the holder arm 85.

Further, the drain opening 97 is connected to an annular drain passage 103 formed between the outer circumferential surface of the supply pipe 99 and the through hole 87D, the hole 101. This drain passage 103 is shut off from the intermediate hole 87B by the seal plug 104, and the drain passage 103 communicates with the intermediate hole 87B through a bypass passage 105 formed in the holder arm 85.

On the other hand, the electrode holder 83 is of pipe shaped member formed with a through hole 107. The free end portion of this electrode holder 83 is bent downward, and a cylindrical electrode holder 109 having the electrode 13 at its end is exchangeably attached to the bent free end portion of the electrode holder 83. The base end portion of the electrode holder 83 is composed of a large diameter portion 111A, an intermediate diameter portion 111B and a small diameter portion 111C formed stepwise in correspondence to the shapes of the three diameter portions 87A, 87B and 87C of the fitting hole 87 of the holder arm 85.

To cool the electrode 13, a supply pipe 113 is passed through the through hole 107 of the electrode holder 83 extending from the base end portion to the free end portion thereof. The base end portion 113A of the supply pipe 113 is supported by a cylindrical seal ring 115 fitted into the small diameter portion 111C of the holder arm 85, and further projects from the end surface of the small diameter portion 111C so as to be connected with the seal ring 104.

Further, in order to communicate an annular drain passage 117 formed between the through hole 107 and the outer circumferential surface of the supply pipe 113 with the intermediate diameter hole 87B of the holder arm 85, a plurality of radially extending communication holes 119 are formed in the small diameter portion 111C of the electrode holder 83 at such a position as to open to the intermediate diameter hole 87B of the fitting hole 87 of the holder arm 85.

In the construction as described above, as shown in FIG. 3, when the electrode holder 83 is required to be exchanged with another electrode holder according to the shape of work W, under the conditions that the electrode holder 83 is connected to the holder arm 85 of the welding arm 15, the fastening bolts 91 are unfastened to release the electrode holder 83 from the holder arm 85. Further when the electrode holer 83 is extracted from the fitting hole 87 of the holder arm 85, it is possible to easily remove the electrode holder 83 from the holder arm 85.

After that, when the base end portion of another electrode holder 83 to be exchanged is fitted into the fitting hole 87 of the holder arm 85, since the small diameter portion 111C, the intermediate diameter portion 111B and the large diameter portion 111a of the electrode holder 83 are all fitted to the small diameter portion 87C, the intermediate diameter portion 87B and the large diameter portion 87A of the fitting hole 87 of the holer arm 85 respectively, and in addition since the base end portion 113A of the supply pipe 113 projecting from the small diameter portion 111C of the electrode holder 83 is fitted into the seal plug 104, the supply pipe 99 of the holder arm 85 can be connected to the supply pipe 113 of the electrode holder 83. Further, the drain passage 103 of the holder arm 85 can be connected to the drain passage 117 of the electrode holder 83 by way of the communication hole 119 of the small diameter portion 111C of the electrode holder 83, the intermediate diameter hole 87B and the bypass passage 105 of the holder arm 85.

After that, when the fastening bolts 91 are fastened, it is possible to fix the electrode holder 83 to the holder arm 85 firmly.

Under these conditions, when cooling water is supplied from the supply opening 95 of the Joint block 93, the supplied cooling water flows from the supply opening 95 to the electrode 13 through the supply pipe 99 of the holder arm 85 and the supply pipe 113 of the electrode holder 83 to cool the electrode 13. After having cooled the electrode 13, the cooling water flows back from the electrode 13 to the drain opening 97 by way of the drain passage 117 and the communication hole 119 of the electrode holder 83, the intermediate diameter hole 87B of the fitting hole 87, the bypass passage 105, the drain passage 103 of the holder arm 85, and then drained to the outside.

In other words, in the present embodiment, it is possible to remove the electrode holder 83 from the holder arm 85 by simply unfastening the fastening bolts 91 and then by extracting the base end portion of the electrode holder 83 from the fitting hole 87 of the holder arm 85. In addition, when the base end portion of the electrode holder 83 is fitted into the fitting hole 87 of the holder arm 85, since the supply pipe 99 and the drain passage 103 of the holder arm 85 can be connected to the supply pipe 113 and the drain passage 117 of the electrode holder 83, it is possible to easily exchange the electrode holer 83 with another electrode holder 83 to the holder arm 85.

Further, it is possible to cool the electrode 13 even if the flow direction of the cooling water is reversed.

As described above, in the spot welding apparatus according to the present invention, it is possible to move the welding arm 15 lightly and further to stabilize the contact pressure of the electrode 13 attached at the free end portion of the welding arm 15 against work W. Further, it is possible to exchange the electrode holder 83 with another electrode holder 83 easily to the holder arm 85 of the welding arm 15.

What is claimed is:

1. A spot welding apparatus in which a column is stood on a base provided with a worktable for supporting work; and a welding arm having an electrode at a free end portion thereof which is supported so as to be pivotable upward and downward at a lower portion of a support cylinder hung from a support beam supported by the column horizontally, said spot welding apparatus comprising:

arm supporting means for supporting an up-and-down rod so as to be movable up and down relative to the support cylinder and supporting the welding arm so as to be pivotable upward and downward and providing an urging force so as to urge said up-and-down rod further upward, said arm supporting means being constructed in such a way that the welding arm is pivotally supported at a lower end portion of a piston rod projecting downward from a piston provided at the lower portion of the support cylinder so as to be movable up and down, and that a hydraulic chamber is provided between the piston and an end block disposed at a lower portion of the support cylinder; and arm pressing means for pressing a free end portion of the welding arm downward against the urging force of said arm supporting means.

2. The spot welding apparatus of claim 1, wherein a vertical position of the support beam is adjustable upward and downward.

3. The spot welding apparatus of claim 2, wherein said arm pressing means comprises a hydraulic cylinder attached to an upper portion of the support cylinder; and said up-and-down rod is fitted into the support cylinder, for pressing downward a piston provided for said arm supporting means, when moved downward by the hydraulic cylinder.

4. The spot welding apparatus of claim 1, wherein hydraulic pressure of the hydraulic chamber is adjustable.

5. The spot welding apparatus of claim 4, wherein said arm pressing means comprises a hydraulic cylinder attached to an upper portion of the support cylinder; and said up-and-down rod is fitted into the support cylinder, for pressing downward a piston provided for said arm supporting means, when moved downward by the hydraulic cylinder.

6. The spot welding apparatus of claim 1, 2, 3 or 4, wherein said arm pressing means comprises a hydraulic cylinder attached to an upper portion of the support cylinder; and said up-and-down rod is fitted into the support cylinder, for pressing downward a piston provided for said arm supporting means, when moved downward by the hydraulic cylinder.

7. A spot welding apparatus according to claim 1, wherein said welding arm comprises:

an electrode holder having an electrode at a free end portion thereof; and a holder arm for exchangeably supporting the electrode holder;

wherein a cooling water supply passage and a cooling water drain passage formed in the holder arm and a cooling water supply passage and a cooling water drain passage formed in the electrode holder are so provided as to be connectable with each other, respectively; and the respective cooling water passages and the cooling water drain passages are both provided concentrically with respect to each other, respectively.

8. The spot welding apparatus of claim 7, wherein a fitting hole formed at a free end portion of the holder arm and a base end portion of the electrode holder are both formed so as to be removably fitted to each other; when the base end portion of the electrode holder is fitted into the fitting hole of the holder arm, an end portion of any one of the cooling water supply passage and the cooling water drain passage of the electrode holder is connected to a sealing plug to which an end of any one of the cooling water supply passage and the cooling water drain passage of the holder arm is connected; and any one of the cooling water drain passage and the cooling water supply passage of the holder arm is connected to any one of the cooling water drain passage and the cooling water supply passage of the electrode holder through a bypass passage formed in the holder arm.

* * * * *